No. 823,280. PATENTED JUNE 12, 1906.
P. C. KETTERER.
DEVICE FOR SUPPORTING WAGONS FOR PAINTING.
APPLICATION FILED FEB. 24, 1906.
2 SHEETS—SHEET 1.
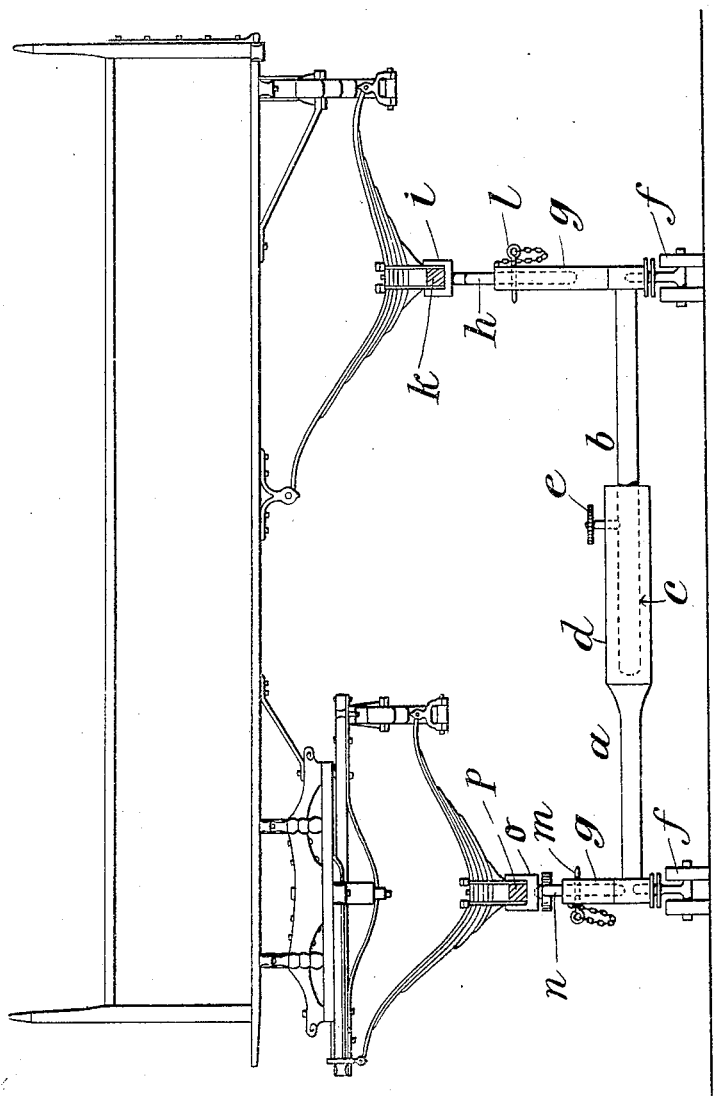

No. 823,280. PATENTED JUNE 12, 1906.
P. C. KETTERER.
DEVICE FOR SUPPORTING WAGONS FOR PAINTING.
APPLICATION FILED FEB. 24, 1906.
2 SHEETS—SHEET 2.
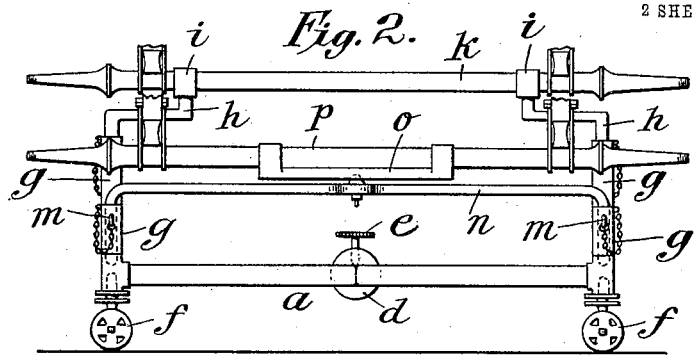
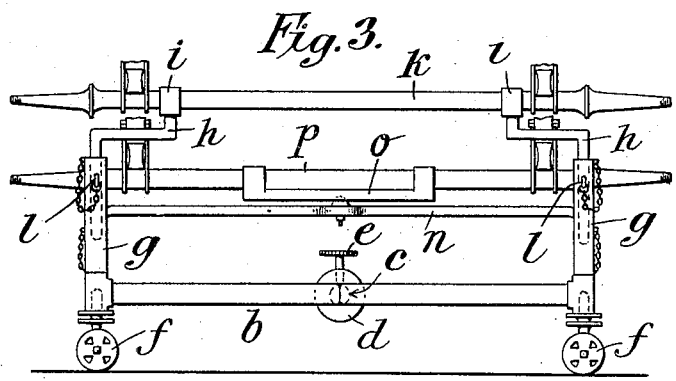
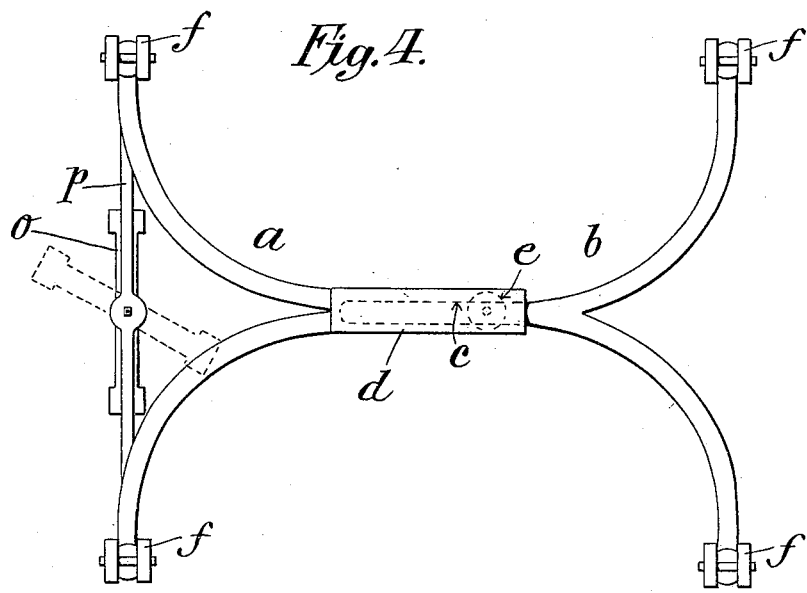
Attest:
Edgeworth Greene
H. L. Pierce.
Inventor:
Percival C. Ketterer
by Redding, Kiddle & Greeley
Attys.

UNITED STATES PATENT OFFICE.

PERCIVAL C. KETTERER, OF NEW YORK, N. Y.

DEVICE FOR SUPPORTING WAGONS FOR PAINTING.

No. 823,280.   Specification of Letters Patent.   Patented June 12, 1906.

Application filed February 24, 1906. Serial No. 302,815.

*To all whom it may concern:*

Be it known that I, PERCIVAL C. KETTERER, a citizen of the United States, residing in the borough of Manhattan, in the city of New York, in the State of New York, have invented certain new and useful Improvements in Devices for Supporting Wagons, &c., for Painting, &c., of which the following is a specification, reference being had to the accompanying drawings, forming a part hereof.

The object of this invention is to provide an improved device for supporting carriages, wagons, trucks, &c., during the painting thereof or during the performance of any other operation thereon.

Various devices, more or less makeshift in character, are used by wagon painters and builders; but they are cumbersome and require considerable labor in their application to a heavy wagon. They commonly require also the removal of some portions of the frame or running-gear of the vehicle.

The improved device or apparatus which embodies the present invention is capable of easy adjustment to any ordinary vehicle, can be applied and manipulated by one man, does not require any part of the vehicle to be moved, and supports the vehicle after application so that access can be had readily to all parts thereof.

The invention will be more fully explained hereinafter with reference to the accompanying drawings, in which it is illustrated as embodied in a convenient and practical form.

In said drawings, Figure 1 is a view in side elevation showing the improved device applied to a wagon-body, the axles of which are shown in section. Fig. 2 is a view in front elevation of the parts shown in Fig. 1, but with the wagon-box removed. Fig. 3 is a view in the rear elevation of the parts shown in Fig. 2. Fig. 4 is an under side view of the device.

In the embodiment of the invention illustrated in the drawings the improved supporting device comprises two members $a$ and $b$, preferably consisting each of a Y-shaped frame. The two members are relatively adjustable longitudinally, and for this purpose the stem $c$ of one of the members may enter a socket $d$, carried by the other member, while a set-screw $e$ is provided to secure them in adjusted position. Each frame or member $a$ and $b$ is provided at its outer extremities with a wheeled truck or caster $f$, swiveled in the frame, as indicated in Figs. 1, 2, and 3, and preferably having two wheels to secure greater firmness. Each frame or member also has at its extremities pillars or sockets $g$. To each of the rear pillars or sockets $g$ is adapted a holder $h$, having a stem to enter the corresponding socket and at its upper end a clip $i$ to receive the rear axle $k$ of the vehicle. The holders $i$ are vertically adjustable to accommodate different vehicles, being held in adjusted position by pins $l$, passed through holes in the pillars and in the stems of the holders and are also removable, so that they can be replaced by other holders to accommodate different vehicles. As shown, the holders $h$ are cranked, so that the clips $i$ may engage the axle $k$ within the body-springs, and it is obvious that they might be cranked more or less or might be straight, according to the necessities of the case.

In the sockets $g$ of the front member $a$ are similarly secured adjustably by pins $m$ the two legs of an inverted yoke $n$, upon which is swiveled at the center a double clip $o$, adapted to engage the front axle $p$. The purpose of this construction is to permit the forward truck of the vehicle to be swiveled, so that access can be had to any part of it without going beneath the wagon-body; but it is obvious that holders similar to the holders $h$ for the rear axle may also be used in the forward pillars $g$.

In the application and operation of the device the vehicle is first jacked up, so that the wheels are clear of the floor. The supporting device is then run under the vehicle, the two members $a$ and $b$ being adjusted longitudinally, so as to bring the front pillars $g$ and rear pillars $g$, respectively, beneath the front and rear axles. The holders $h$ are then adjusted vertically in position to receive the rear axle, and the yoke $n$ is similarly adjusted vertically to place the double clip $o$ in position to receive the front axle. The jacks are then lowered until the rear axle rests in the clips $i$ and the front axle in the double clip $o$ and are removed. The wheels of the vehicle are then removed, and the vehicle-body, with its running-gear, can then be pushed about the floor upon the supporting device into any desired position. If it is desired to get at the rear side of the swiveled front truck, it can be readily turned with the swiveled clip $o$ to bring the rear to the front or to one side, as may be desired.

It will be seen that it is unnecessary to remove the front truck or any other part of the vehicle to permit the application of the supporting device thereto and that the supporting device can be manipulated and applied to any ordinary vehicle by one man, while the device permits access to be had without difficulty to any part of the vehicle. It will be understood that the form of the supporting device and its parts can be varied as desired to suit different conditions of use.

I claim as my invention—

1. A device of the character described, comprising two frame members relatively adjustable longitudinally, trucks at the extremities of said members and supporting-pillars and holders mounted upon said members at the extremities thereof.

2. A device of the character described comprising two frame members relatively adjustable longitudinally, trucks at the extremities of said members supporting-pillars mounted upon said members at the extremities thereof, and holders mounted adjustably upon said pillars.

3. A device of the character described comprising a frame, trucks at the extremities thereof, supporting-pillars and holders mounted on the frame at the rear extremities thereof, and a swiveled holder mounted upon said frame at the front end thereof.

4. A device of the character described comprising a frame, trucks at the extremities thereof, supporting-pillars mounted upon the frame at the extremities thereof, holders mounted in the pillars at the rear end thereof, a yoke mounted in the pillars at the front end thereof, and a swiveled holder mounted upon said yoke.

5. A device of the character described comprising two frame members relatively adjustable longitudinally, trucks at the extremities of said members supporting-pillars and holders mounted upon the rear member at its extremities, a swiveled holder supported by the front member.

This specification signed and witnessed this 21st day of February, 1906.

PERCIVAL C. KETTERER.

In presence of—
GEO. D. WEEKS,
FRED LAUER.